(12) United States Patent
Price

(10) Patent No.: US 12,083,776 B2
(45) Date of Patent: Sep. 10, 2024

(54) ADHESIVE WRAPPING SYSTEM

(71) Applicant: Dana Price, Willard, MO (US)

(72) Inventor: Dana Price, Willard, MO (US)

( * ) Notice: Subject to any disclaimer, the term of this patent is extended or adjusted under 35 U.S.C. 154(b) by 364 days.

(21) Appl. No.: 17/114,643

(22) Filed: Dec. 8, 2020

(65) Prior Publication Data
US 2021/0187896 A1    Jun. 24, 2021

Related U.S. Application Data

(60) Provisional application No. 62/950,471, filed on Dec. 19, 2019.

(51) Int. Cl.
| | | |
|---|---|---|
| *B32B 3/12* | (2006.01) | |
| *B32B 3/28* | (2006.01) | |
| *B32B 7/06* | (2019.01) | |
| *B32B 27/08* | (2006.01) | |
| *B65D 81/03* | (2006.01) | |

(52) U.S. Cl.
CPC .................. *B32B 3/12* (2013.01); *B32B 3/28* (2013.01); *B32B 7/06* (2013.01); *B32B 27/08* (2013.01); *B65D 81/03* (2013.01); *B32B 2405/00* (2013.01); *B32B 2553/026* (2013.01)

(58) Field of Classification Search
CPC .... B32B 3/12; B32B 3/28; B32B 7/06; B32B 27/08; B32B 2405/00; B32B 2553/026; B65D 81/03; C09J 7/22; C09J 7/29; Y10T 428/28; Y10T 428/24661
USPC ................................ 428/72, 178, 40.1, 41.8
See application file for complete search history.

(56) References Cited

U.S. PATENT DOCUMENTS

| | | | |
|---|---|---|---|
| 4,894,265 | A | 1/1990 | Chang et al. |
| 5,849,394 | A | 12/1998 | Bussey et al. |
| 6,279,300 | B1 | 8/2001 | Simhaee |
| 7,041,361 | B2 | 5/2006 | Thomsen et al. |
| 9,322,164 | B2 | 4/2016 | Ray et al. |

FOREIGN PATENT DOCUMENTS

| | | | | |
|---|---|---|---|---|
| JP | 10072063 | A | * | 3/1998 |
| JP | 10218239 | A | * | 8/1998 |

OTHER PUBLICATIONS

Translation of JP10218239A. (Year: 1998).*
Translation of JP10072063A. (Year: 1998).*

* cited by examiner

*Primary Examiner* — Catherine A. Simone
(74) *Attorney, Agent, or Firm* — Boudwin Intellectual Property Law, LLC; Daniel Boudwin

(57) ABSTRACT

An adhesive wrapping system is provided. The adhesive wrapping system has a flexible sheet of material which has a planar layer and an opposing padding layer. The padding layer comprises a plurality of concave recessions, which when mated with the planar layer, forms gas-filled bubbles that provide a cushioning surface. The sheet of material further comprises a plurality of perforations which are linearly disposed across the sheet to provide a user with the ability to select a size and shape of material to be used. An adhesive is also disposed along at least one length of the sheet of material which secures the material to a desired surface, such as the sheet of material itself. A removable adhesive covering is disposed over the adhesive to preserve the adhesive until the adhesive is exposed for use.

1 Claim, 3 Drawing Sheets

ADHESIVE WRAPPING SYSTEM

CROSS REFERENCE TO RELATED APPLICATIONS

This application claims the benefit of U.S. Provisional Application No. 62/950,471 filed on Dec. 19, 2019. The above identified patent application is herein incorporated by reference in its entirety to provide continuity of disclosure.

BACKGROUND OF THE INVENTION

The present invention relates to packing cushion devices. More particularly, the present invention provides for an adhesive wrapping system comprising a plurality of cushioning bubbles disposed on a sheet of material, wherein the sheet also includes a plurality of perforations and adhesive, such that a user can selectively choose the size and shape of the sheet of material to package a desired item.

Many people ship packages containing fragile items. These items must be carefully protected from impacts and jostling that may occur while in transit. Often bubble wrap is used to provide cushioning to prevent damage to the item by surround it with air-filled cushions. Such bubble wrap typically comes in large rolls, or pre-sized sheets, which then needs to be cut to size and secured about the item with tape. Sizing, cutting, and securing the bubble wrap can be very frustrating, as a user must pre-measure the amount of bubble wrap to be used, cut the bubble wrap to an appropriate size, and then wrap the item while holding it in place to retrieve tape to secure the bubble wrap about the item. Oftentimes, the tape can fail, and the bubble wrap can unravel and fall away from a portion of the item or fall off altogether. Additionally, many people have difficulty properly sizing and packing the item, resulting in wasted materials.

The present invention substantially diverges in design elements from the known art and consequently it is clear that there is a need in the art for an improvement to existing packing cushion devices. In this regard the present invention substantially fulfills these needs.

SUMMARY OF THE INVENTION

In view of the foregoing disadvantages inherent in the known types of packing cushion devices now present in the prior art, the present invention provides an adhesive wrapping system wherein a user can selectively choose the size and shape of a sheet of material comprising cushioning bubbles and secure the same about a desired item in order to protect the item. The present adhesive wrapping system has a flexible sheet of material which has a planar layer and an opposing padding layer. The padding layer comprises a plurality of concave recessions, which when mated with the planar layer, forms gas-filled bubbles that provide a cushioning surface. The sheet of material further comprises a plurality of perforations which are linearly disposed across the sheet to provide a user with the ability to select a size and shape of material to be used. An adhesive is also disposed along at least one length of the sheet of material which secures the material to a desired surface, such as the sheet of material itself. A removable adhesive covering is disposed over the adhesive to preserve the adhesive until the adhesive is exposed for use.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
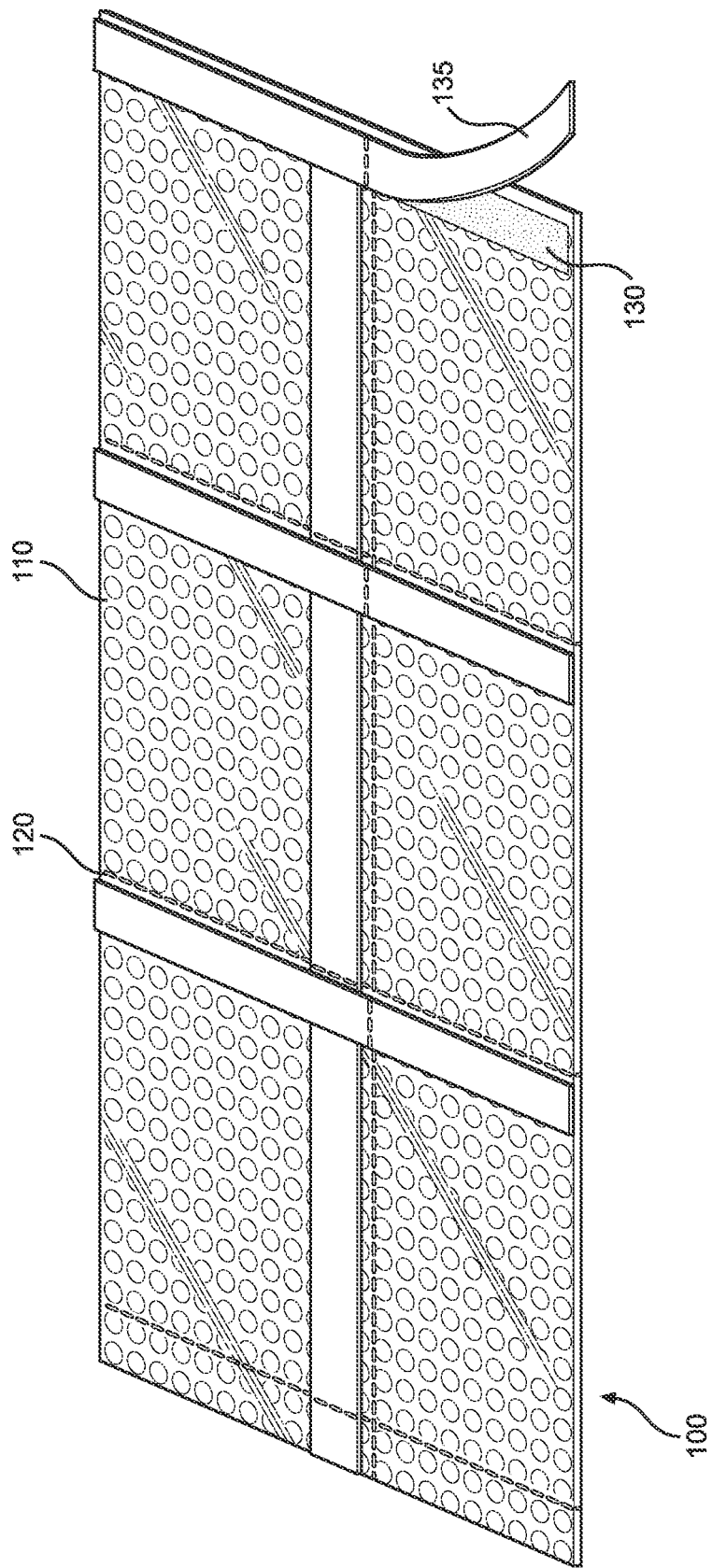
FIG. 1 shows a rear perspective view of an embodiment of the adhesive wrapping system.

Reference is made herein to the attached drawings. Like reference numerals are used throughout the drawings to depict like or similar elements of the adhesive wrapping system. For the purposes of presenting a brief and clear description of the present invention, a preferred embodiment will be discussed as used for the adhesive wrapping system. The figures are intended for representative purposes only and should not be considered to be limiting in any respect.

Referring now to FIG. 1, there is shown a rear perspective view of an embodiment of the adhesive wrapping system. The adhesive wrapping system 100 comprises a flexible sheet of material 110. The flexible sheet of material 110 is configured to be bent, and in some embodiments folded, to surround a desired object such that a user can envelope and package the object to prevent it from becoming damaged or harmed. In one embodiment, the flexible sheet of material 110 is composed of a plastic material. In various embodiments, additional materials such as those used in packaging and shipping which provide benefits such as thermal absorption, insulation, anti-static characteristics, and the like may be also be used and are contemplated by the present disclosure.

The flexible sheet of material 110 is composed of at least one layer and in various embodiments the flexible sheet of material 110 is composed of multiple layers. It should be understood that the present disclosure is not limited to the number of layers detailed in the embodiments discussed below, and the present disclosure contemplates a wide variety in the number of layers utilized. In one embodiment, the flexible sheet of material 110 has a planar layer and a padding layer (as more detailed in the discussion of FIG. 2A, below). In an alternate embodiment, the flexible sheet of material 110 has a first planar layer, a padding layer, and a second planar layer (as more detailed in the discussion of FIG. 2B, below). In yet another alternate embodiment, the flexible sheet of material 110 has a first planar layer, a second planar layer, a first padding layer, and a second padding layer (as more detailed in the discussion of FIG. 2C, below).

The sheet of material 110 further comprises a plurality of perforations 120, linearly disposed across the sheet 110. Each of the perforations 120 transect each layer of the sheet 110 such that the sheet 110 can be divided along the perforations 120. One of ordinary skill in the art will understand how the perforations 120 can be utilized to subdivide the sheet 110 and how such perforations 120 can be utilized to select a desired size and shape of a piece of the sheet 110. In various embodiments, the perforations 120 are linearly disposed across the sheet 110 in a horizontal and a vertical orientation. Where the perforations 120 are linearly disposed across the sheet 110 in a horizontal orientation, the sheet 110 can be subdivided along a width of the sheet 110. Where the perforations 120 are linearly disposed across the sheet 110 in a vertical orientation, the sheet 110 can be subdivided along a length of the sheet 110. In one embodiment, each line of the plurality of perforations 120 is evenly spaced apart from each other. Such an even spacing allows a user to easily plan which perforations 120 to utilize to subdivide the sheet 110 for their desired use. In one embodiment, the plurality of perforations 120 is linearly disposed across the sheet 110 in both a horizontal and vertical direction, thereby forming and defining a grid of perforations 120. Such a grid of perforations 120 provides a user with the ability to utilize a smaller subdivision of the sheet, for example a square that is only half of a width of the sheet 110.

An adhesive 130 is disposed along at least one external portion of the sheet of material 110. The adhesive 130 is configured to secure the sheet 110 to a desired surface, including the sheet of material 110 itself. Similar to the plurality of perforations 120, the adhesive 130 can be disposed linearly across the length or width of the sheet 110. In one embodiment, the adhesive 130 is disposed across the sheet of material 110 in both a horizontal and vertical direction thereby forming and defining a grid of adhesive 130. In another embodiment, the adhesive 130 is disposed along a perimeter of the sheet of material 110. In some embodiments, the adhesive 130 does not continue uninterrupted across the sheet 110 in order to minimize the amount of adhesive 130 needed. In a further embodiment, each length of adhesive 130 is evenly spaced apart from another length of adhesive 130.

A removable adhesive covering 135 is disposed over the adhesive 130. The adhesive covering 135 is configured to preserve and protect the adhesive 130 from debris until such time as the adhesive covering 135 is removed. The adhesive covering 135 enables the adhesive 130 to retain its adhering qualities. In one embodiment, the adhesive covering 135 extends beyond the adhesive 130 in order to provide the user with an easy way to grip and remove the adhesive covering 135. In use, the object desired to be packaged can be placed on the sheet of material 110. Once the sheet 110 is sized appropriately, each of the adhesive coverings 135 can be removed to expose the adhesive 130. In some circumstances a user may elect to remove all of the adhesive coverings 135 to expose all of the adhesive 130 on the sheet 110 to provide a maximized number of points of contact between the adhesive 130 and the desired surface. In some circumstances a user may elect to remove only a subset of the adhesive coverings 135, such as to enable reuse of the sheet 110 with the unexposed adhesive 130 at a later date. In embodiments, the perforations 120 extend through the adhesive coverings 135 along with the adhesive 130 and the sheet 110 such that a user is able to tear the sheet 110 into smaller sections with unexposed adhesive 130.

Figure 2A:
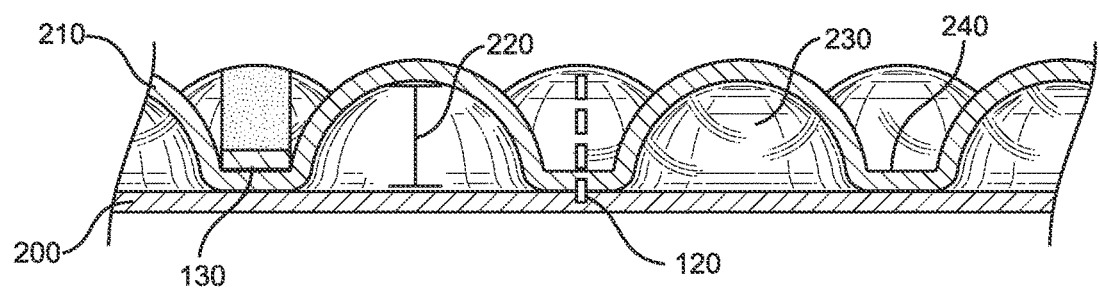
FIG. 2A shows a cross-sectional view of an embodiment of the adhesive wrapping system.

Referring now to FIG. 2A, there is shown a cross-sectional view of an embodiment of the adhesive wrapping system. In the shown embodiment, the sheet of material is composed of a single planar layer 200 and a single padding layer 210. The padding layer 210 comprises a plurality of concave recessions 220. The planar layer 200 is mated to the padding layer 210 such that a gas is trapped between the planar layer 200 and the concave recessions 220 of the padding layer 210 forming bubbles 230. One of ordinary skill in the art will understand how the bubbles 230 can act as a cushion to protect an item surrounded by said bubbles 230. In some embodiments, the gas is air, however, the present disclosure also contemplates other gases that may have desirable qualities. Although the sheet of material in the shown embodiment is composed of two layers, a single planar layer 200 and a single padding layer 210, the present disclosure also contemplates that the sheet of material is composed of a single layer, and that the bubbles 230 are formed within the single layer.

In the shown embodiment, the bubbles 230 are linearly disposed, wherein each line of bubbles 230 is offset from an adjacent line. In some embodiments, each line of bubbles 230 is aligned with those bubbles 230 in the adjacent line. As previously discussed, the sheet of material comprises perforations 120 and adhesive 130. In the shown embodiment, each line of bubbles 230 is offset from the adjacent line, and the plurality of perforations 120 bisect both the bubbles 230 and each valley 240 defined between the bubbles 230. In some embodiments, the perforations 120 only bisect the valleys 240, thereby eliminating open bubbles 230 and wasted excess materials. In some further embodiments, wherein each line of bubbles 230 is offset from an adjacent line, and the perforations 120 only bisect the valleys 240, the perforations 120 do not extend across the sheet 110 linearly and can zigzag between the bubbles 230. Such an embodiment enables a user to select a subsection of the sheet 110 in a nonlinear fashion thereby providing the user with the ability to select and create a subsection of the sheet 110 in a wide variety of shapes. Further, in the shown embodiment, the adhesive 130 is disposed both on an exterior surface of the bubbles 230 and on an exterior surface of the valleys 240. In various embodiments, the adhesive is also disposed on a surface of the planar layer 200 opposing that surface of the planar layer 200 which is mated to the padding layer 210. In the shown embodiment, the linear perforations 120 are separated from the adhesive 130 by a width of a bubble 230. In such an embodiment, a layer of bubbles 230 provides cushioning on either side of the adhesive 130 and greater protection when the adhesive 130 is utilized to adhere to a desired surface. In some embodiments, the adhesive 130 is disposed over multiple lines of bubbles 230 and valleys 240 to provide a wider area of adhesive and a greater surface are. In other embodiments, the adhesive 130 is disposed over a planar section of the sheet 110 which is devoid of bubbles 230 and valleys 240.

Figure 2B:
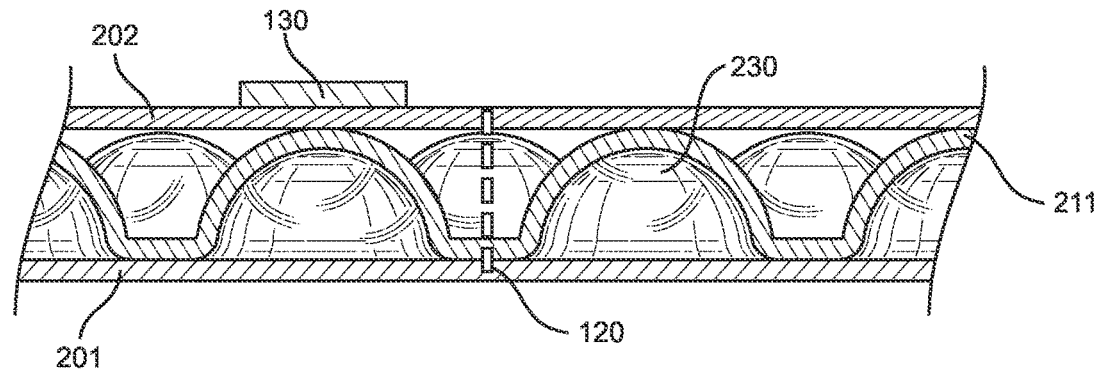
FIG. 2B shows a cross-sectional view of an alternate embodiment of the adhesive wrapping system.

Referring now to FIG. 2B, there is shown a cross-sectional view of an alternate embodiment of the adhesive wrapping system. In the shown embodiment, the sheet of material is composed of a first planar layer 201, a first padding layer 211, and a second planar layer 202. In such an embodiment, the first padding layer 211 comprises a plurality of concave recessions 220 and the first planar layer 211 is mated to the first padding layer 211 such that a gas is trapped between the first planer layer 211 and the concave recessions 220 of the first padding layer 211. Further, the second planar layer 202 is mated to the first padding layer 211 on an opposing surface of the first padding layer 211 being mated to the first planar layer 211. In such an embodiment, the second planar layer 202 provides additional protection to the bubbles 230 such that they are not as easily penetrated. The second planar layer 202 also provides the benefit of planar surfaces being on either side of the sheet of material. In the shown embodiment, the adhesive 130 is disposed on an exterior surface of the second planar layer 202. In other embodiments, the adhesive 130 is disposed on an exterior surface of the first planar layer 201, and an exterior surface of both the first and second planar layers 201, 202. Further, in the shown embodiment, the adhesive 130 is disposed directly adjacent to the plurality of perforations 120. The plurality of perforations 120 also traverse the first and second planar layers 201, 202 as well as the first padding layer 211. In such an embodiment, the adhesive 130 is utilized to seal a terminal edge of the sheet of material when the sheet of material is separated at the perforations 120.

Figure 2C:
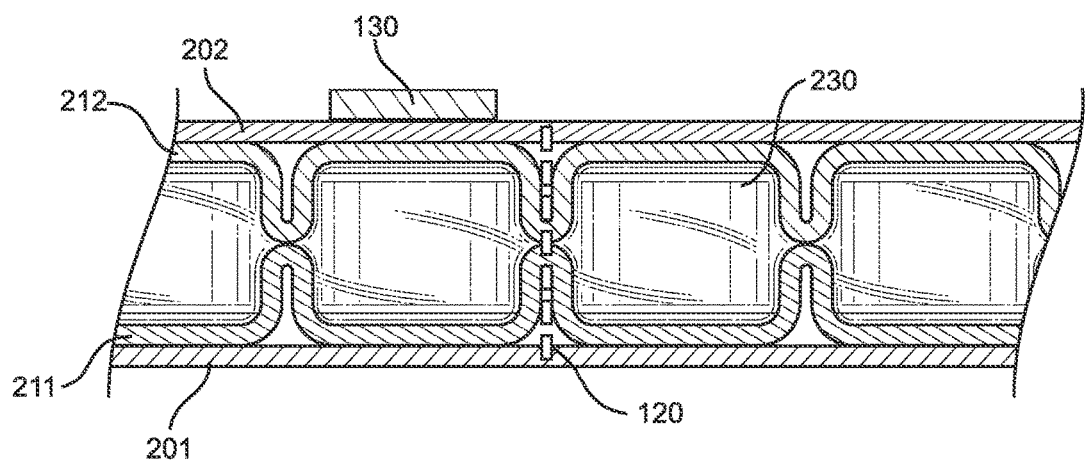
FIG. 2C shows a cross-sectional view of an alternate embodiment of the adhesive wrapping system.

Referring now to FIG. 2C, there is shown a cross-sectional view of an alternate embodiment of the adhesive wrapping system. In the shown embodiment, the sheet of material is composed of the first planar layer 201, the second planar layer 202, the first padding layer 211, and a second padding layer 212, Further, in the shown embodiment, both the first padding layer 211 and the second padding layer 212 comprise a plurality of concave recessions 220. The first padding layer 211 is mated to the second padding layer 212 such that a gas is trapped between the first padding layer 211 and the second padding layer 212. In one embodiment, the plurality of concave recessions 220 of the first padding layer 211 are aligned with the plurality of concave recessions 220 of the second padding layer 212 forming bubbles 230. In other embodiments, the plurality of concave recessions 220 of the first padding layer 211 are not aligned with the plurality of concave recessions 220 of the second padding layer 212, but gas is still trapped between the two layers 211, 212. For example, in one embodiment the plurality of concave recessions 220 of the first padding layer 211 partially overlap with the plurality of concave recessions 220 of the second padding layer 212. In another embodiment, the plurality of concave recessions 220 of the first padding layer 211 do not overlap at all with the plurality of concave recessions 220 of the second padding layer 212. In the shown embodiment, the first planar layer 201 is mated to the first padding layer 211 on an opposing surface of the first padding layer 211 being mated to the second padding layer 212. Additionally, the second planar layer 202 is mated to the second padding layer 212 on an opposing surface of the second padding layer 202 being mated to the first padding layer 211. In such an arrangement the first and second planar layers 201, 202 provides protection to the bubbles 230 formed by the first and second padding layers 211, 212. Additionally, the bubbles 230 formed can be larger and have different shapes and characteristics as desired.

Figure 3:
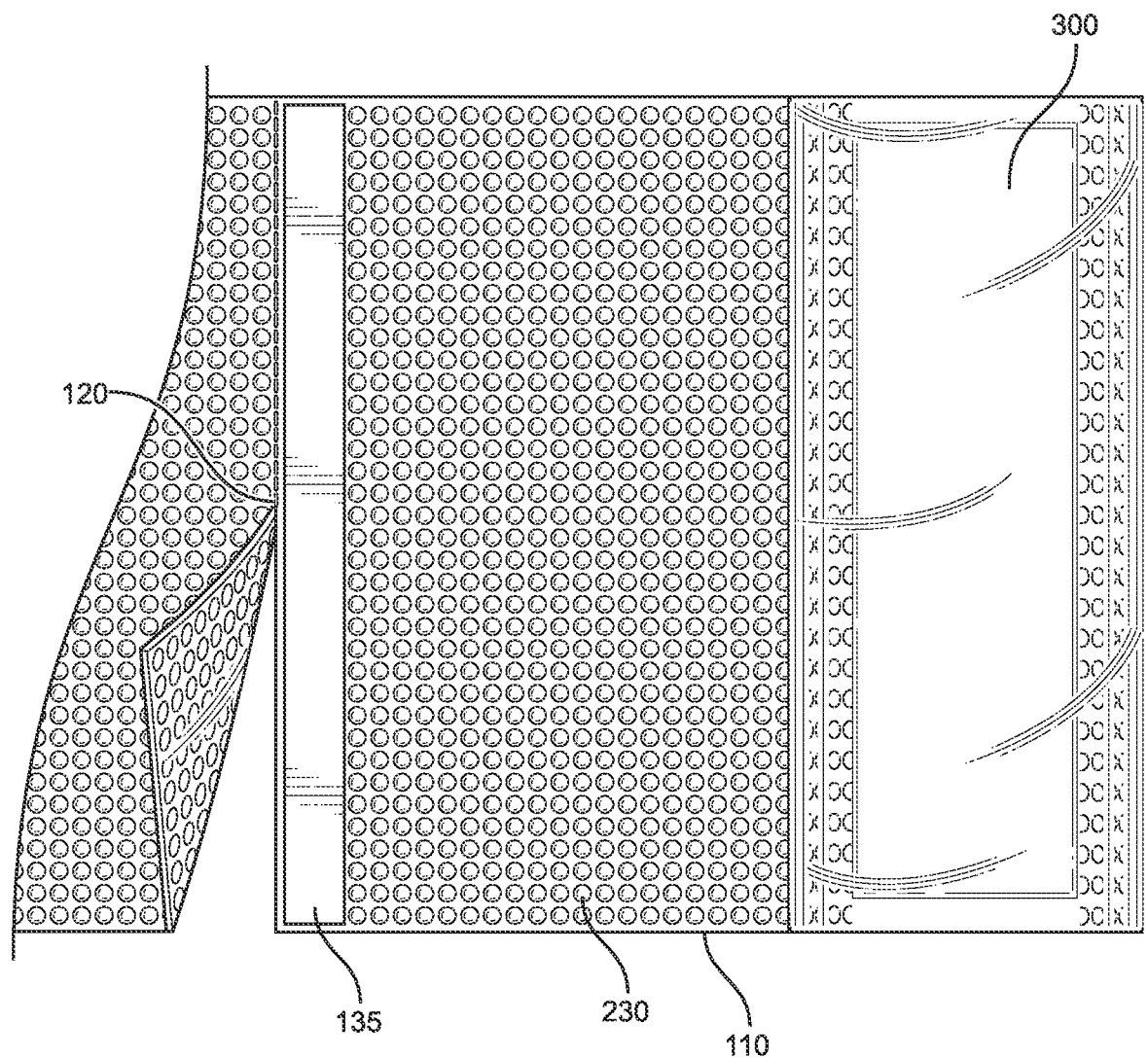
FIG. 3 shows a front perspective view of an embodiment of the adhesive wrapping system, in use.

Referring now to FIG. 3, there is shown a front perspective view of an embodiment of the adhesive wrapping system, in use. In use, a length of a flexible sheet of material 110 can be laid out. A desired object 300 can be lain on top of the sheet 110 and the sheet 110 can be bent and folded such that the object 300 is enveloped by the sheet 110. A user can then separate the used portion of the sheet 110 from the remainder of the sheet 110 through utilization of a plurality of perforations 120 disposed through the sheet 110. A user can then remove desired removable adhesive coverings 135 to expose an adhesive. The adhesive can then be used to adhere the sheet 110 to a desired surface, such as another portion of the sheet 110 itself. In this manner, a user can surround the desired object 300 with bubbles 230 that are disposed throughout the sheet 110. The bubbles 230 can protect the desired object 300 from impacts and damage. In this manner, a user can selectively choose the size and shape of a sheet of material 110 comprising cushioning bubbles 230 and secure the same about a desired object 300 in order to protect the object 300.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. An adhesive wrapping system, consisting of:
a flexible sheet of material having a planar layer and a padding layer;
the padding layer comprising a plurality of concave recessions;
the planar layer is mated to the padding layer such that a gas is trapped between the planar layer and the concave recessions of the padding layer producing a plurality of bubbles;
the flexible sheet of material further comprising a plurality of perforations linearly disposed across the flexible sheet of material;
an adhesive disposed along at least one external portion of the flexible sheet of material; and
a removable adhesive covering disposed over the adhesive;
wherein the gas is air and the bubbles are a plurality of air bubbles;
wherein the bubbles are linearly disposed and each line of the bubbles are offset from an adjacent line of the bubbles;
wherein the perforations bisect the bubbles and each valley between the bubbles in each line of the bubbles;
wherein the adhesive is disposed both on an exterior surface of each of the bubbles and on an exterior surface of each of the valleys;
wherein the perforations are separated from the adhesive by a width of one of the bubbles and a layer of the bubbles provides cushioning on either side of the adhesive and additional protection when the adhesive is utilized to adhere to a desired surface;
wherein the flexible sheet of material is plastic;
wherein the perforations are linearly disposed across the flexible sheet of material in both a horizontal and a vertical direction forming a grid;
wherein the adhesive is disposed across the flexible sheet of material in both a horizontal and a vertical direction forming a grid; and
wherein each line of the perforations is evenly spaced apart from each other.

* * * * *